United States Patent
Okamoto et al.

(10) Patent No.: US 6,369,519 B1
(45) Date of Patent: Apr. 9, 2002

(54) DIELECTRIC BARRIER DISCHARGE LAMP LIGHT SOURCE

(75) Inventors: Masashi Okamoto, Akashi; Kenichi Hirose, Takasago, both of (JP)

(73) Assignee: Ushiodenki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/555,512
(22) PCT Filed: Oct. 18, 1999
(86) PCT No.: PCT/JP99/05728
  § 371 Date: Jun. 5, 2000
  § 102(e) Date: Jun. 5, 2000
(87) PCT Pub. No.: WO01/30120
  PCT Pub. Date: Apr. 26, 2001

(51) Int. Cl.[7] ............................................. H05B 37/02
(52) U.S. Cl. .................... 315/224; 315/276; 315/DIG. 7
(58) Field of Search ................................ 315/224, 267, 315/276, 277, DIG. 7

(56) References Cited

U.S. PATENT DOCUMENTS

| | | | |
|---|---|---|---|
| 4,818,915 A | * | 4/1989 | Zaslavsky .................... 315/60 |
| 4,983,881 A | | 1/1991 | Eliasson et al. |
| 5,604,410 A | | 2/1997 | Vollkommer et al. |

FOREIGN PATENT DOCUMENTS

| | | |
|---|---|---|
| JP | 1-243363 | 9/1989 |
| JP | 2-7353 | 1/1990 |

OTHER PUBLICATIONS

Denki Gakkai, "Discharge Handbook", p. 263, Jun. 1989, Revised Edition, 7th Printing.

* cited by examiner

*Primary Examiner*—David Vu
(74) *Attorney, Agent, or Firm*—Nixon Peabody LLP; David S. Safran (57) ABSTRACT

To provide dielectric-barrier discharge lamp light source equipment that can produce eximer molecules efficiently and operate efficiently as a vacuum ultraviolet radiation source a dielectric-barrier discharge lamp 1 is lit by impressing high-frequency, alternating current voltage from a power supply 8 that comprises a transformer and a high-frequency power supply of the bridge, push-pull or fly-back type. At that time, the voltage is impressed so that after passing the point in time when the voltage value to start a dielectric-barrier discharge is reached, there is period of less than 3 μs from the largest voltage value to the next largest voltage value. It is also possible to impress the voltage on the dielectric-barrier discharge lamp 1 for a period of less than 2.1 μs from the voltage value at which the dielectric-barrier discharge commences until the maximum voltage value in the next round of voltage impression.

3 Claims, 11 Drawing Sheets

Fig.8   time τ elapsed after the discharge voltage peak (μsec)

Fig.9 time T12 separating the first and second voltage peaks (μsec)

Fig.10 ringing frequency Fr (kHz)

DIELECTRIC BARRIER DISCHARGE LAMP LIGHT SOURCE

FIELD OF TECHNOLOGY

This invention concerns light source equipment that includes what is called a dielectric-barrier discharge lamp, which is a type of discharge lamp used, for example, as a source of ultraviolet radiation for photochemical reactions, in which eximer molecules are formed by dielectric-barrier discharge, and which uses light emitted from the eximer molecules.

DESCRIPTION OF THE RELATED ART

Technical literature explaining the technology involved in the dielectric-barrier discharge lamps with which this invention is concerned can be found in, for example, JPO kokai patent report H2-7353. This document describes an emitter that produces light by causing the formation of eximer molecules by means of a dielectric barrier discharge in a discharge chamber filled with a discharge gas that forms eximer molecules, and using the light radiated by those eximer molecules (a dielectric barrier discharge is also known as ozonizer discharge or silent discharge; see Denki Gakkai, "Discharge Handbook," revised edition, 7th printing, June 1989, p. 263).

Figure 19A:
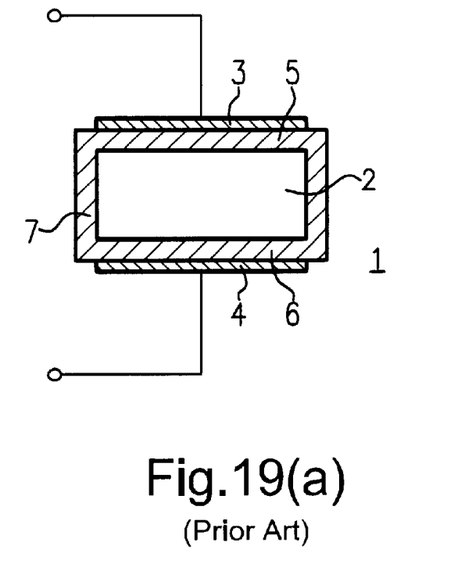

Dielectric-barrier discharge lamps have a discharge plasma space and one or two dielectrics sandwiched between electrodes. FIG. 19(a) shows a dielectric-barrier discharge lamp 1 with two dielectrics 5, 6. In FIG. 19(a), by the way, the lamp seal 7 also serves as two dielectrics 5, 6.

When lighting up the dielectric-barrier discharge lamp 1, a high-frequency, alternating current of, for example 10 to 200 kHz and 2 to 10 kV is imposed on the electrodes 3,4.

However, because of the dielectrics 5,6 between the discharge plasma space 2 and the electrodes 3,4, current does not flow directly from the electrodes 3,4 to the discharge plasma space 2; the current flows by means of the action of the dielectrics 5,6 as a condenser. In other words, a charge equal in size and opposite in sign to that on electrodes 3,4 is induced on the discharge plasma space side of the dielectrics 5,6 because of polarization of the dielectric. The discharge occurs between the dielectrics 5,6 that face across the discharge plasma space 2.

Little current flows along the discharge plasma space 2 side of the dielectrics 5,6; when discharge occurs, the charge induced on the discharge plasma space 2 side of the dielectrics 5,6 is neutralized by the charge moved by the discharge, and the electrical field within the discharge plasma space 2 is reduced. For that reason, the current stops even if the voltage continues to be impressed on the electrodes 3,4. But when the voltage impressed on the electrodes 3,4 rises again, the discharge current continues.

When the discharge ceases after having occurred, there is no further discharge until the polarity of the voltage impressed on the electrodes 3,4 has reversed.

In the case of a dielectric-barrier discharge lamp in which xenon gas, for example, is sealed, the xenon gas is dissociated into ions and electrons by the discharge, and becomes xenon plasma. When the xenon plasma is excited to a specified energy level, eximer molecules are formed within the plasma. Xenon eximers divide after a certain lifespan, but the energy released at that time is emitted as a photon of vacuum ultraviolet wavelength. To make a dielectric-barrier discharge lamp work efficiently as a vacuum ultraviolet light source, it is necessary to form the eximer molecules efficiently.

The greatest obstacle to efficient formation of eximer molecules during discharge is the excitation of the discharge plasma to energy levels that do not contribute to the formation of eximer molecules.

The movement of discharge plasma electrons immediately after discharge begins is collective, and the energy is high but the temperature is low. In this state, the discharge plasma has a high probability of transition to the resonant state required for formation of eximer molecules. If the discharge time is prolonged, however, the movement of the plasma electrons gradually becomes thermal. That is, it reaches a state of thermal equilibrium known as a Maxwell-Boltzmann distribution; the plasma temperature rises, and there is an increased probability of transition to a state of higher excitation where eximer molecules cannot form.

Moreover, sometimes when eximer molecules have been formed, a subsequent discharge will break down the eximer molecules before their lifespan elapses and they divide naturally by emitting the desired photon. In fact, in the case of xenon eximers, a period of about 1 $\mu$s is required between the beginning of discharge and emission of a vacuum ultraviolet photon, and a subsequent discharge or redischarge during that period reduces the efficiency of eximer light emission.

In other words, once discharge had commenced, it is most important to reduce as much as possible the energy of subsequent discharges.

Even in the event that the discharge time is short, if the energy injected during the discharge period is too great, there is similarly an increased probability of transition to a state of high excitation. Plasma that has transitioned to a state of high excitation moderates itself by emission of infrared radiation, which just raises the temperature of the lamp and does not contribute to eximer light emission.

That is, the discharge must be driven so as to suppress the excitation of discharge plasma to energy levels that do not contribute to the formation of eximer molecules. That point is one that cannot be satisfied by conventional dielectric-barrier discharge lamp light source equipment.

JPO kokai patent report H1-243363 is a proposal to achieve eximer light emission with high efficiency by means of all pulse discharges, including dielectric-barrier discharges. This follows the condition stated above that once a discharge has begun, the energy of the subsequent discharge is reduced as much as possible. However, what is described in this proposal is which parameters to control to increase the efficiency of eximer light emission; there is no specific mention of the effective conditions for those parameter values. Particularly in the case of dielectric-barrier discharges, there is little freedom for control of the voltage that has to be impressed and the current that has to be injected into the discharge plasma space through the dielectric, and it is extremely difficult to discover the optimum conditions.

There are proposals to improve the efficiency of dielectric-barrier discharge lamps, such as JPO patent report H8-508363 (U.S. Pat. No. 5,604,410). However, these reports say nothing about specific items that are truly effective in achieving control of the excitation of discharge plasma to energy levels that do not contribute to formation of eximer molecules, so as to form eximer molecules efficiently. There are descriptions of the results of experiments on variation of brightness relative to variation of impressed voltage, in connection with frequency and duty cycle, with regard to short pulse arrays and short waveforms, as well as explanations of improvement of efficiency relative to conventional sinewave drive.

Actual power supplies, however, include high-voltage transformers, and are unable to impress ideal short pulse arrays and short waveforms; because of interaction of the output impedance of the power supply and the impedance of the lamp, the waveform lacks precision, and partial resonance causes a sinewave voltage to be impressed.

In the event of discrepancies from ideal short waveforms in such actual power supplies, unless it is clear what degree of discrepancy is allowed, it is not possible to design or manufacture practical light source equipment economically.

This invention was made in consideration of the situation described above; its purpose is provide dielectric-barrier discharge lamp light source equipment that can produce eximer molecules efficiently and operate efficiently as a vacuum ultraviolet light source.

SUMMARY OF THE INVENTION

In order to form eximer molecules efficiently, which is the task of the invention of this application, the excitation of discharge plasma at energy levels that will not contribute to the formation of eximer molecules is controlled. To accomplish that, once the voltage impressed on the lamp has climbed at a limited rate of ascent, reached the voltage for the commencement of discharge and started the discharge, then the discharge should be stopped as quickly as possible.

Figure 19B:
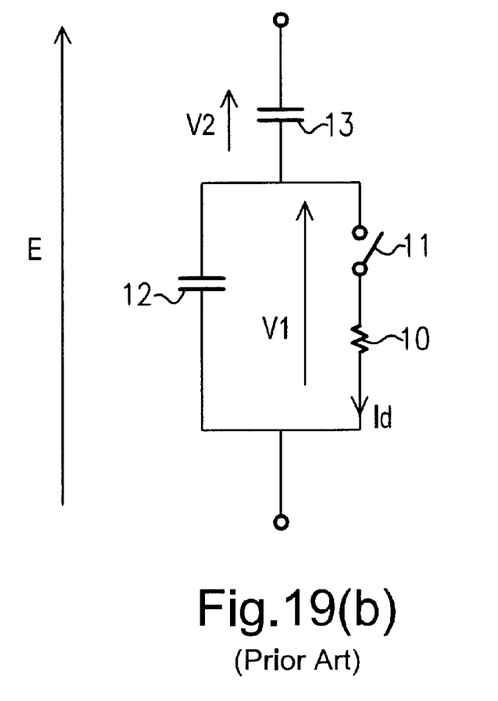

Operation of the electrical circuitry of the dielectric-barrier discharge lamp 1 is explained by FIG. 19(b). As shown in FIG. 19(b), the discharge path of the discharge plasma space 2 continues in series with a resistor 10 and a switch 11. The dielectric-barrier discharge lamp 1 has dielectrics 5,6 between the electrodes 3,4 and the discharge plasma space 2, and it functions as a condenser within the electrical circuitry. In the event that there are two pieces of dielectric, however, the two condensers can be thought of as a single condenser 13.

Because the structure has this condenser inserted in series with the discharge plasma space 2, discharge current flows through the dielectric-barrier discharge lamp 1 only for a period immediately after the change in polarity of the voltage impressed on the lamp, and a non-discharge period occurs naturally, even without impressing voltage on the lamp as a pulse voltage that has a rest period that is essentially zero voltage.

Moreover, discharge does not occur until the voltage of the discharge plasma space 2 reaches the voltage for the commencement of discharge.

The discharge plasma space 2 itself forms a condenser 12, and when discharge begins, almost all the energy stored in this condenser is expended, and so once the discharge begins, there is no need for additional current to the dielectric-barrier discharge lamp 1 from the power supply.

The unit area of the lamp wall surface is considered next.

The voltage for the commencement of discharge is decided almost automatically when the gas pressure and the discharge gap are decided. And because the size of the discharge gap determines the static capacity C1 of the condenser 12 formed by the discharge plasma space, the minimum energy that can be put into the plasma between the commencement and completion of a single discharge is the energy of a full discharge of the charge stored in the condenser 12 formed by the discharge plasma space. That determines the constitution of the lamp.

It was stated above that in order to form eximer molecules efficiently, the excitation of discharge plasma at energy levels that will not contribute to the formation of eximer molecules is controlled. That control is best achieved through the conditions for discharge of that minimum energy.

However, the conditions for discharge of that minimum energy can be realized in an ideal fashion by very slowly raising the voltage impressed on the lamp, and then discharging it, using a power supply with an output impedance that is quite large.

There are, however, problems in applying such a power supply in an actual light source.

The first problem is that when the output impedance is large, it is not possible to operate fast enough to discharge in cyclical repetitions.

The second problem is that under conditions for discharge of the minimum energy, there will be a lack of uniformity of discharge within a single lamp because of a lack of positional uniformity of the discharge gap within the lamp.

Accordingly, using a power supply that has the small output impedance that can realize the necessary volume of light, in order to have a practical light source that produces uniform discharges over the full surface of the dielectric-barrier discharge lamp, it is necessary to raise the voltage impressed on the lamp beyond the minimum energy conditions for discharge. However, the degree to which the voltage impressed on the lamp is raised should be held below the range that would allow a drop in the efficiency of eximer light emission.

That is, the peak value of the voltage impressed on the lamp should be based on the lowest value at which the lack of discharge uniformity can be ignored practically, and should be held to 2 times that lowest value, preferably 1.5 times the lowest value. Or to base it on the lowest value for maintaining the discharge, it should be held to 3 times, preferably 2.5 times that lowest value. Now, when the lamp power is increased, it is done not by raising the voltage impressed on the lamp, but by increasing the drive frequency of the lamp power supply. Because a fixed volume of lamp current flows each time the voltage impressed on the lamp is reversed, the lamp power is proportional to the drive frequency. Therefore, by increasing that drive frequency, it is possible to increase the lamp power without the bad effects that would accompany an increase of the voltage impressed on the lamp.

Figure 1:
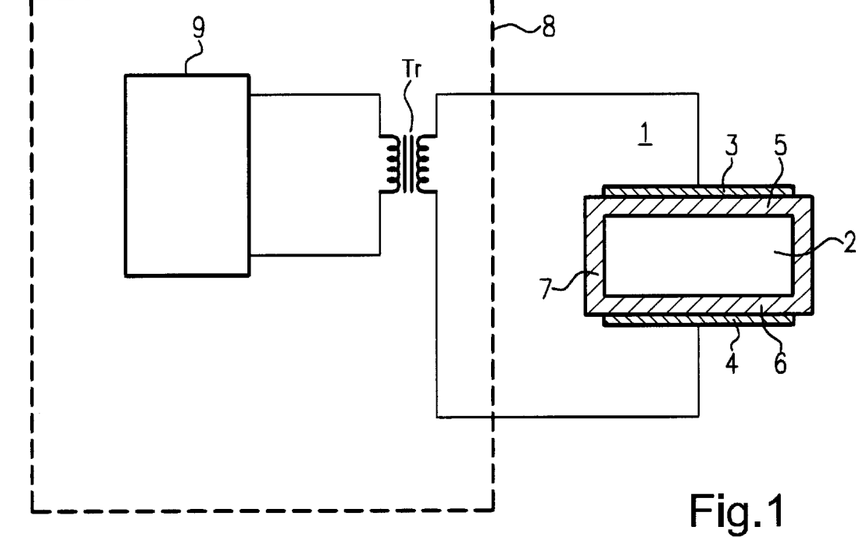
FIG. 1 is a diagram showing the basic constitution of a dielectric-barrier discharge lamp light source.

The basic constitution of the dielectric-barrier discharge lamp light source equipment is shown in FIG. 1. In the figure, 1 is the dielectric-barrier discharge lamp described above, and 8 is the power supply. The power supply 8 comprises a high-frequency alternating current power supply 9 of the bridge, push-pull or fly-back type, and a step-up transformer Tr.

Figure 2:
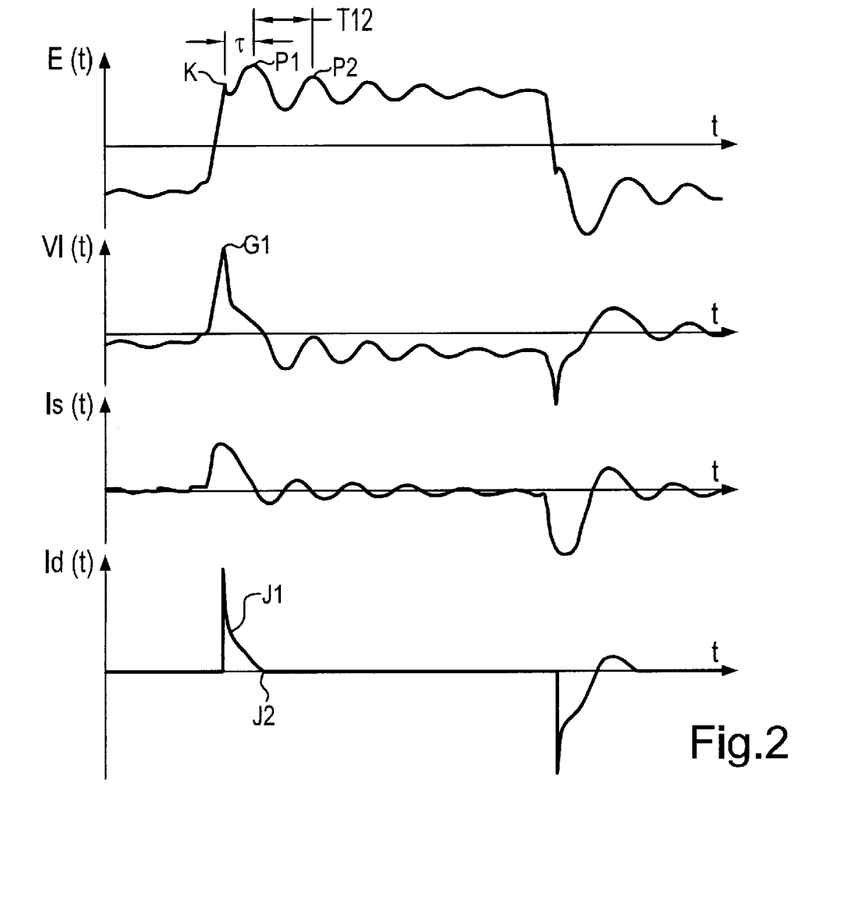
FIG. 2 illustrates typical waveforms in an actual power supply for impressed lamp voltage E(t), discharge gap voltage Vl(t), current Is(t), and discharge current Id(t).

Typical waveforms for the voltage impressed on the lamp E(t), the discharge gap voltage (that is, the voltage of the discharge plasma space) Vl(t), lamp current Is(t) and discharge current Id(t) of a practical power supply are shown in FIG. 2 (the figure shows waveforms obtained from a computer simulation modelling the circuit and lamp based on a full-bridge power supply, but they would be basically the same with a half-bridge or push-pull type power supply).

Now with regard to the discharge current Id(t), it is the current in the lamp flowing through the resistor in FIG. 19(b), so the waveform cannot be measured directly, but if it is possible to measure the waveform data for the voltage impressed on the lamp E(t) and the lamp current Is(t), it can be calculated from the static capacitance C1 of the condenser 12, which is the discharge plasma space shown in FIG. 19(b), the static capacitance C2 of the condenser 13 which is the dielectrics 5,6, and floating static capacitance C3 which exists in parallel with the dielectric-barrier discharge lamp.

That is, the static capacitance C1 of the condenser 12, which is the discharge plasma space, the static capacitance C2 of the condenser 13 which is the dielectrics 5,6, and floating static capacitance C3 which exists in parallel with the dielectric-barrier discharge lamp determine the two relationships F=1+C1/C2 and Cv=C1+C3·F. Using that, the discharge current Id(t) can be found from the following formula (1).

$$Id(t)=F \cdot Is(t)-Cv \cdot dE(t)/dt \quad (1)$$

Because this method uses numerical differentiation, the precision is not to good in regions where the current values of the waveform obtained as a result are small, but it does indicate the rapid rise when discharge commences, so there is no problem as long as it is used for that purpose.

In FIG. 2, when the voltage impressed on the lamp E(t) suddenly changes polarity, the discharge gap voltage Vl(t) also makes a quick change, and when it reaches the voltage for the commencement of discharge at point G1 discharge commences. When discharge commences, the discharge current waveform J1 (see the discharge current Id(t) waveform in FIG. 2), rapidly appears, and as a result the discharge gap voltage Vl(t) drops suddenly. In response to this sudden drop of the discharge gap voltage Vl(t) (that is, the voltage in the discharge plasma space), the voltage impressed on the lamp E(t) also drops, producing the indentation at point K.

The point on the voltage impressed on the lamp waveform that corresponds to point J2 where the discharge current ceases is the point P1 with the largest absolute value, or slightly beyond that. In evaluating actual light source equipment, that point can be taken as located at the point P1 with the largest absolute value.

Thereafter, the change of the waveform of the voltage impressed on the lamp is reduced by C2/(C1+C2) times, and the waveform of the discharge gap voltage Vl(t) is expressed as is. As used here, C1 and C2 are the static capacitance C1 of the condenser 12, which is the discharge plasma space, and the static capacitance C2 of the condenser 13 which is the dielectrics 5,6, as described above. In the case of a dielectric-barrier discharge lamp that has dielectrics 5,6 for both electrodes 3,4, C2 can be thought of as the independent static capacitance of each dielectric, in series.

In a practical power supply, the voltage impressed on the lamp has an indentation at point K for the following reason. In response to the sudden drop of the discharge gap voltage Vl(t) (which is the voltage of the discharge plasma space) described above, the voltage impressed on the lamp E(t) drops as well. The power supply 8 attempts to compensate for the drop in the voltage impressed on the lamp, but because of the presence of an inductive output impedance caused by the magnetic leakage of the step-up transformer or the inductance of the cable, compensation for the drop in the voltage impressed on the lamp is delayed, and as a result, the indentation in the direction of the greatest absolute value at point K is produced. Moreover, because of resonance between this inductive output impedance and the static capacitance of the dielectric-barrier discharge lamp 1, an oscillating component is incorporated in the voltage impressed on the lamp following the indentation at point K. The points with greatest absolute value and least absolute value are produced on the waveform of the voltage impressed on the lamp as a result.

Hereafter, the oscillation that follows the indentation at point K is called ringing, and its frequency is the ringing frequency Fr. The time period from the commencement of discharge at point K to the peak value of the voltage impressed on the lamp E(t) is called τ, and the period from the peak P1 that appears after the indentation at point K to the next peak P2 is T12.

This invention focuses on variation of the waveform of the voltage impressed on the lamp following the indentation at point K, and attempts to inject power into the dielectric-barrier discharge lamp effectively, without lowering the efficiency of ultraviolet light emission.

That is, eximer molecules are produced by the discharge that occurs with the sudden rise or fall of the waveform of the voltage impressed on the lamp E(t) as described above, and the eximer molecules are broken down if further discharge current is added in the period before the eximer molecules dissociate and produce ultraviolet radiation. Accordingly, it is desirable from the perspective of efficient production of ultraviolet radiation to cut off the discharge current quickly.

Nevertheless, the discharge current continues from the commencement of discharge at the indentation at point K to the first peak of the voltage impressed on the lamp E(t). Therefore, if there is a long period τ from the commencement of discharge until the voltage impressed on the lamp peaks, the efficiency of ultraviolet radiation is reduced as a result. Moreover, in the state where ringing occurs following the indentation at point K, the discharge current continues until the peak is reached. Thus when the ringing frequency is low, it takes longer for the discharge current to cease, and the efficiency of ultraviolet radiation is reduced as a result.

In other words, a dielectric-barrier discharge lamp can be made to discharge without reducing the efficiency of ultraviolet light emission by shortening the period τ from the commencement of discharge to the first peak of the voltage impressed on the lamp, or by increasing the ringing frequency Fr.

In this case, the period τ from the commencement of discharge to the first peak of the voltage impressed on the lamp and the ringing frequency Fr are generally determined by the impedance L and the static capacitance C of the circuit comprising the power supply 8 and the dielectric-barrier discharge lamp 1. By making these values smaller, it is possible to shorten the time τ, and to increase the ringing frequency.

In this case the discharge ceases when the first peak P1 is passed (that is, the switch in FIG. 19(b) is opened at that time), so when the first peak P1 is passed, the waveform of the voltage impressed on the lamp E(t) oscillates up and down at a frequency determined by the static and floating capacitances of the condensers 12,13 and the circuit inductance L show in FIG. 19(b).

Because the discharge is completed immediately after the first peak P1 is passed, the period T12 from the first peak P1 to the second peak P2 will correspond to the period of oscillatory frequency determined by the static and floating capacitances of the condensers 12,13 and the circuit inductance L.

Generally it is possible to calculate the resonant frequency of an LC resonant circuit by the following formula:

$$LC=1/(2\pi f)^2$$

Accordingly, given the inductance L and static capacitance C of the circuit above, the ringing frequency Fr is roughly determined by $1/\{2\pi \cdot f \sqrt{(LC)}\}$ and the value of the static capacitance C depends on the static capacity of the dielectric-barrier discharge lamp 1, so to increase the ringing frequency Fr (shorten the period τ) it is best to reduce the value of the inductance L. Specifically, it is possible to increase the ringing frequency Fr by reducing the coupling inductance of the step-up transformer Tr.

On the basis of the concept stated above, the inventors investigated the relationship between the period τ and the efficiency of ultraviolet light emittance during period T12 from peak P1 to peak P2.

Figure 8:
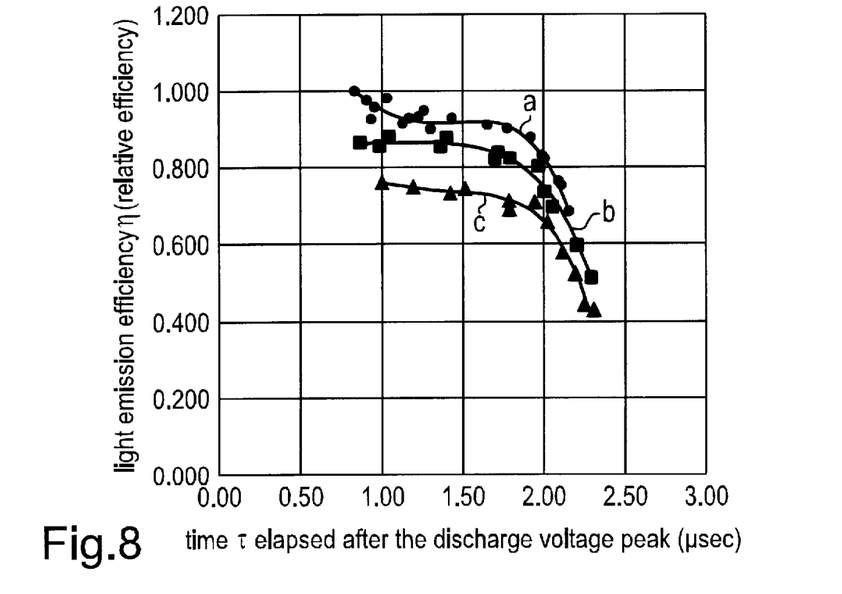
FIG. 8 is a graph of the relationship between time τ and light emission efficiency η.
Figure 9:
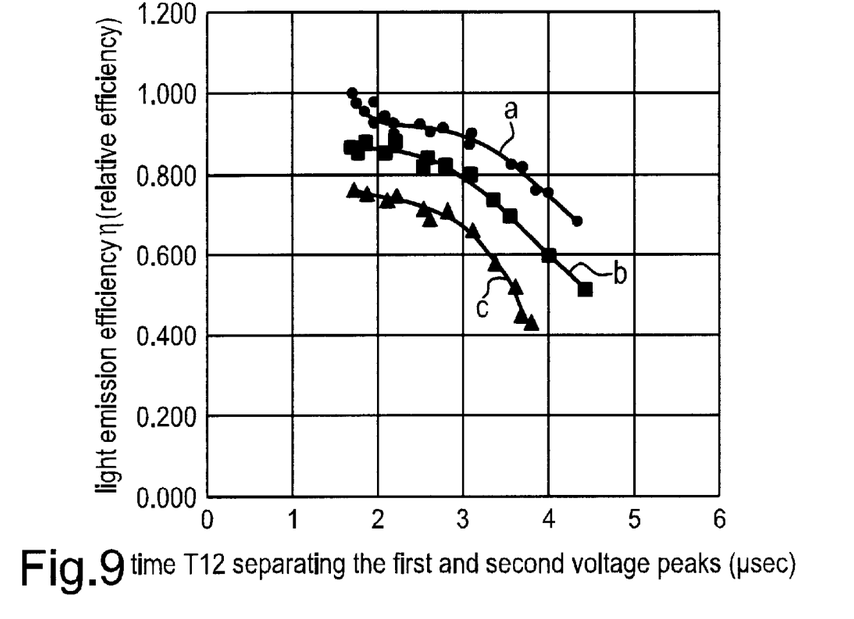
FIG. 9 is a graph of the relationship between time T12 and light emission efficiency η.
Figure 10:
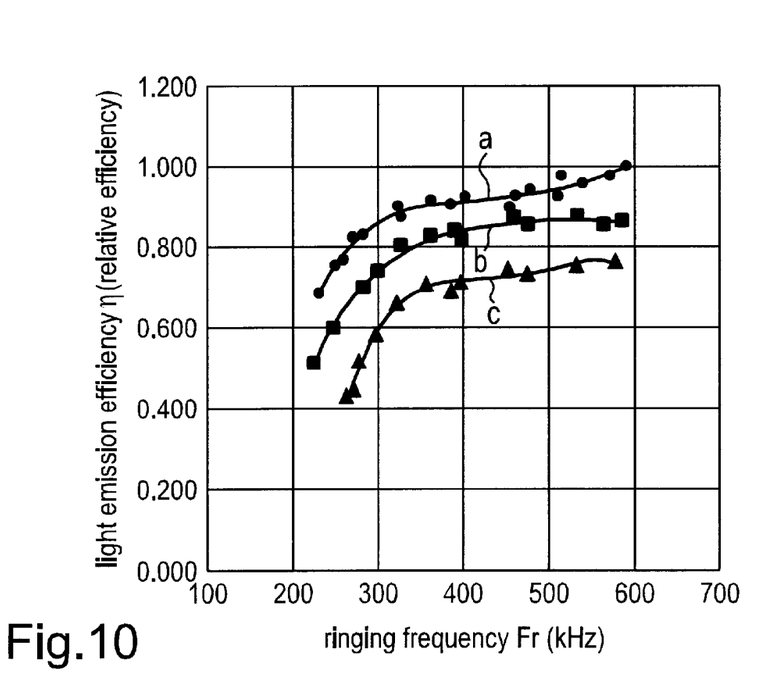
FIG. 10 is a graph of the relationship between ringing frequency Fr and light emission efficiency η.

As a result, it was learned that, as shown in FIGS. 8, 9 and 10 described below, it is possible to discharge a dielectric-barrier discharge lamp without reducing the ultraviolet light emission efficiency if the period $\tau \leq 2.1$ μs, the period $T12 \leq 3$ μs, or the ringing frequency $Fr \geq 300$ kHz.

In this case, the ringing frequency Fr is roughly determined by $1/\{2\pi \times \sqrt{(LC)}\}$, so it is best if $LC < 2.8 \times 10^{-13}$, where the unit of C is F (farad) and the unit of L is H (henry).

Because the value of LC stated above is roughly determined by the static capacitance of the lamp 1 and the inductance of the transformer Tr, the inductance of the transformer Tr should be selected so that the value of LC meets the condition stated above with respect to the static capacity of the lamp 1.

The measured value of the static capacitance C can be gotten from such things as the inductance while the lamp is burning. The measurement of L should be gotten by measuring the inductance on the secondary side of the transformer Tr with an impedance meter while recreating the state on the primary side based on the state immediately after the completion of discharge when lighting the lamp.

If a full-bridge or half-bridge high-frequency alternating current power supply is used, for example, the inductance on the secondary side of the transformer can be measured while the primary side is shorted. In the case of a push-pull power supply, the inductance on the secondary side of the transformer can be measured by shorting the center of the primary side with one end, leaving the other end open. And in the case of a fly-back power supply, the inductance on the secondary side of the transformer Tr can be measured with the primary side open.

Now, depending on the power supply 8 being used, sometimes the indentation at point K mentioned above will not appear clearly in the waveform of the voltage impressed on the lamp.

The absence of a clear indentation in the waveform of the voltage impressed on the lamp is particularly frequent in the case of a fly-back power supply. In that case, the waveform of the discharge current Id(t) can be calculated, and the steepest part of its rise taken as the indentation.

The invention described in claims 1 to 3 of this invention is one that defines the practical conditions for discharge in a dielectric-barrier discharge lamp with good efficiency, based on what is stated above; by fulfilling any of the following conditions, it is possible to make a dielectric-barrier discharge lamp discharge efficiently.

(1) After passing the point in time when the voltage value to start a dielectric-barrier discharge is reached, voltage is impressed on the dielectric-barrier discharge lamp for a period of not more than 3 μs from the largest voltage value to the next largest voltage value.

(2) Voltage is impressed on the dielectric-barrier discharge lamp for a period of not more than 2.1 μs from the voltage value at which the dielectric-barrier discharge commences until the maximum voltage value in the next round of voltage impression.

(3) Taking L as the inductance and C as the static capacitance of the circuit comprising the supply equipment and the dielectric-barrier discharge lamp, the inductance L and static capacitance C are selected to fulfill the following formula:

$$LC \leq 2.8 \times 10^{-13}$$

BRIEF DESCRIPTION OF THE DRAWINGS

FIGS. 19(*a*)–19(*b*) are diagrams of a dielectric-barrier discharge lamp having two dielectrics pieces, and of an equivalence circuit to illustrate the electrical operation.

DETAILED DESCRIPTION OF THE INVENTION

The mode of implementation of this invention is explained below.

Figure 3:
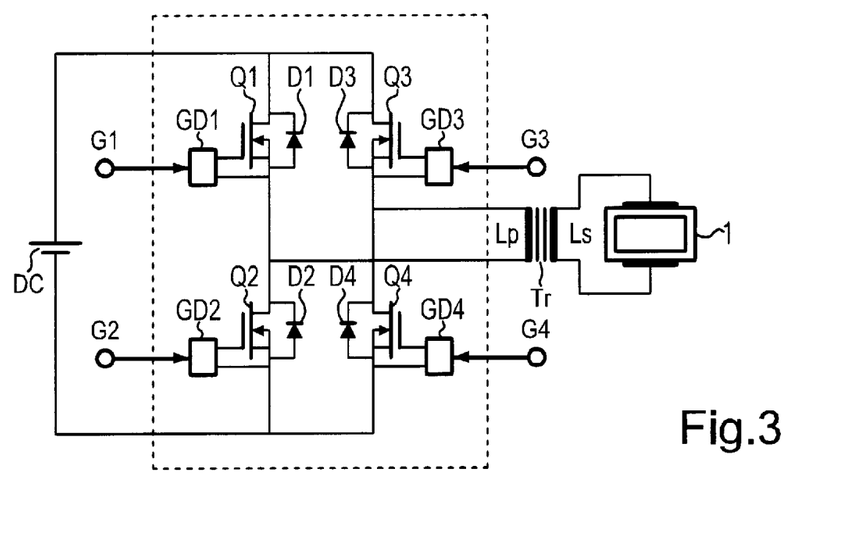
FIG. 3 is a circuit diagram showing one example of a lighting circuit (full bridge) for the dielectric-barrier discharge lamp of an implementation of this invention.

FIG. 3 is a circuit diagram showing one example of a lighting circuit for the dielectric-barrier discharge lamp of an implementation of this invention; the figure shows a dielectric-barrier discharge lamp lighting circuit that uses a full-bridge inverter circuit. In the figure, Lp is the primary coil of the step-up transformer Tr, and D1 through D4 are diodes.

Figure 4:
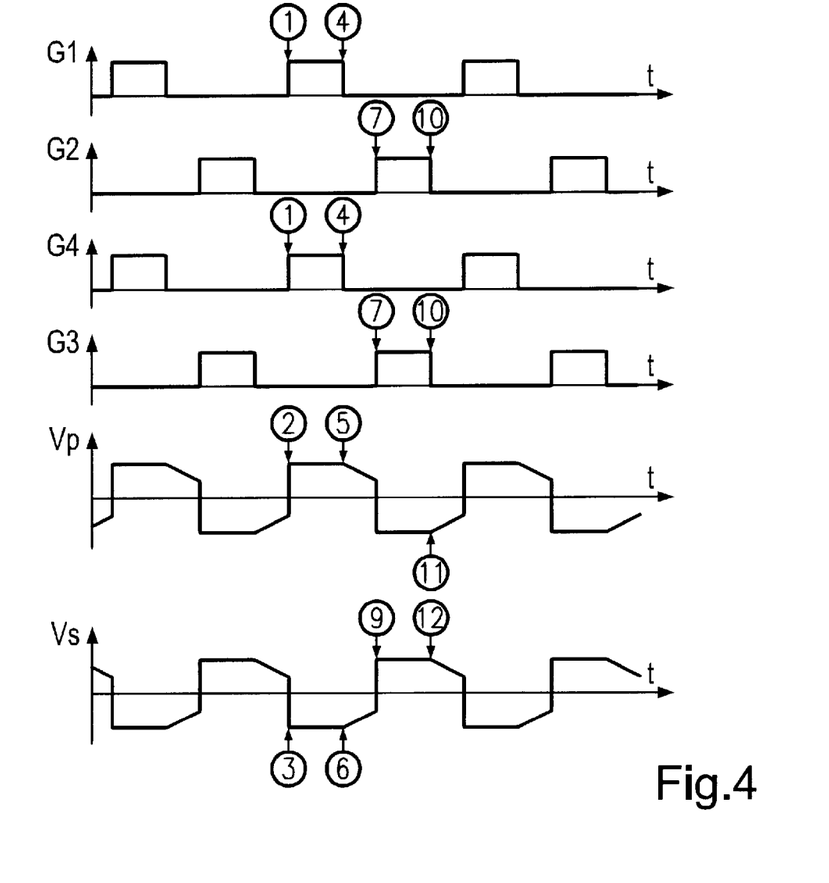
FIG. 4 shows waveforms to explain the operation of the lighting circuit in FIG. 3.

FIG. 4 is a diagram that shows waveforms to explain the operation of the lighting circuit; it is a model representation of the waveforms in a case where there is no primary or secondary leakage inductance in the transformer, and the capacitive load continues without the discharge phenomenon. In the drawing, Q1 through Q4 are switching elements (FET's, for example), G1 through G4 are the gate signals of switching elements Q1 through Q4, Vp is the primary voltage of the step-up transformer Tr (hereafter "transformer Tr"), and Vs is the voltage on the secondary side of the transformer Tr.

The operation of the lighting circuit in FIG. 3 is explained by FIG. 4.

(a) When the first gate signal G1 and the fourth gate signal G4 are turned ON, the gate drive circuits GD1, GD4 make the first switching element Q1 and the fourth switching element Q4 conductive (point (1) in the drawing); a direct current voltage from the direct current power supply DC is impressed on the primary side of the transformer Tr (point (2) in the drawing); and voltage is produced on the secondary side of the transformer Tr and the voltage is impressed on the dielectric-barrier discharge lamp 1 (point (3) in the drawing).

(b) When the first gate signal G1 and the fourth gate signal G4 are turned OFF (point (4) in the drawing), the first switching element Q1 and the fourth switching element Q4 are opened; the voltage Vp on the primary side of the transformer Tr and the voltage Vs on the secondary side of the transformer begin an unstable change at a speed related to the resonant frequency determined by the leakage inductance of the transformer Tr and the static capacitance of the secondary side of the transformer Tr (points (5), (6) in the drawing).

(c) When the second gate signal G2 and the third gate signal G3 are turned ON, the gate drive circuits GD2, GD3 make the second switching element Q2 and the third switching element Q3 conductive (point (7) in the drawing); a direct current voltage reversed from that in (a) above is impressed on the primary side of the transformer Tr; and a voltage reversed from that in (a) above is produced on the secondary side of the transformer Tr and the reversed voltage is impressed on the dielectric-barrier discharge lamp 1 (point (9) in the drawing).

(d) When the second gate signal G2 and the third gate signal G3 are turned OFF (point (10) in the drawing), the second switching element Q2 and the third switching element Q3 are opened; the voltage Vp on the primary side of the transformer Tr and the voltage Vs on the secondary side of the transformer begin an unstable change at a speed related to the resonant frequency determined by the leakage inductance of the transformer Tr and the static capacitance on the secondary side of the transformer Tr (points (11), (12) in the drawing).

(e) The operations (a) through (d) are repeated thereafter.

Figure 5:
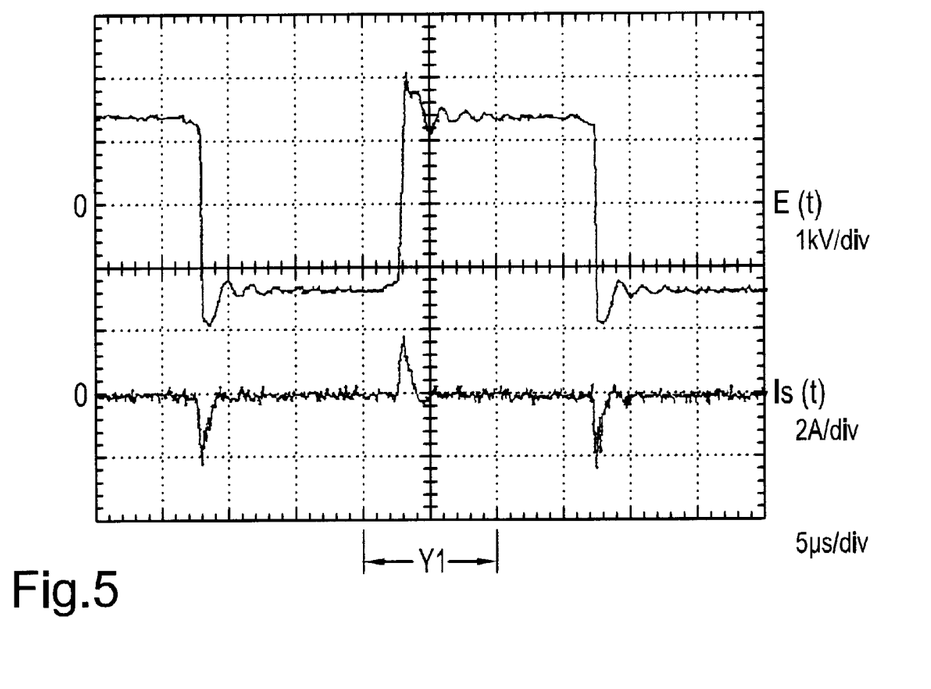
FIG. 5 shows measured data for the impressed voltage waveform E(t) and current waveform I(t) in the lighting circuit in FIG. 3.
Figure 6:
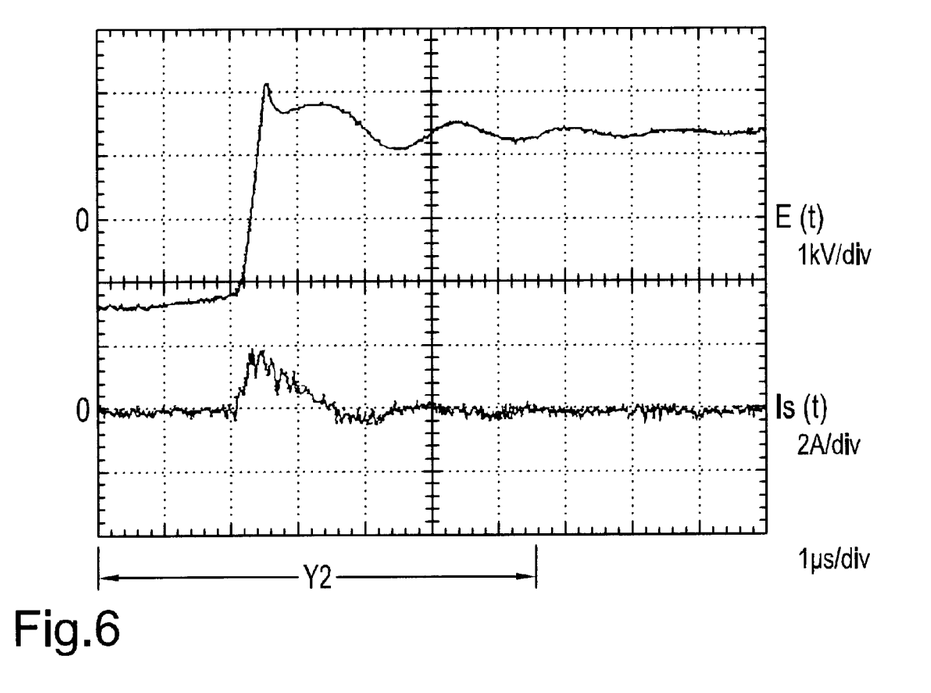
FIG. 6 is an enlarged view of measured data for the impressed voltage waveform E(t) and current waveform I(t) in the lighting circuit in FIG. 3.

FIGS. 5 and 6 are measured data for the waveforms of the voltage impressed on the lamp E(t) and the current I(t) in the circuit described above. FIG. 6 is an enlarged view of the Y1 portion of FIG. 5; the waveforms were measured under the conditions mentioned below. Now, these conditions are the conditions that most efficiently light the lighting circuit of FIG. 3.

| Frequency: | |
|---|---|
| Transformer Tr | |
| Primary inductance: | 1.42 mH |
| Secondary inductance: | 204 mH |
| Coupling impedance: | .99955 |

| Dielectric-barrier discharge lamp | |
|---|---|
| Dielectric: | quartz glass 1 mm thick |
| Discharge gas: | xenon at 33 kpa |
| Discharge gap: | 4.3 mm |
| Non-discharge static capacitance of lamp: | 84 pF |

Figure 7:
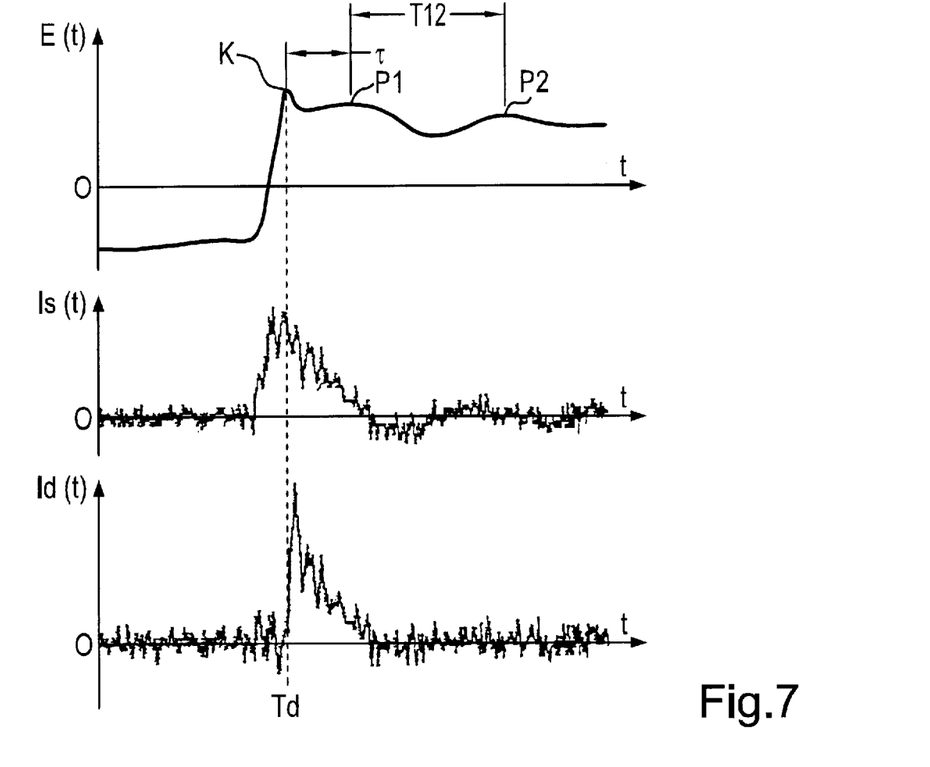
FIG. 7 is an enlarged view of the Y2 portion of FIG. 6, adding a calculated discharge current waveform Id(t).

FIG. 7 shows the waveform of the discharge current Id(t), the result of an analytical calculation, in addition to the waveforms of the voltage impressed on the lamp E(t) and the current 1(t) shown in FIGS. 5 and 6. It is an expanded view of portion Y2 of FIG. 6. The following conditions are used in the analytical calculation:

| Static capacitance C1 of discharge plasma space: | 97.2 pF |
|---|---|
| Static capacitance C2 of dielectric: | 607 pF |
| Floating capacitance C3: | 70 pF |

The indentation at point K is clearly expressed in FIG. 7, and because the waveform of the discharge current Id(t) is rising sharply at that point Td, it is knowing that indentation point K is the beginning of the discharge. The time period from the indentation at point K to the first subsequent peak P1 is τ, and the time period from the first peak P1 to the second peak P2 is T12. Following the first peak P1, there is oscillation in the voltage impressed on the lamp E(t).

In the lighting circuit of FIG. 3, the lighting efficiency is found by adding inductance to the secondary side of the transformer Tr to adjust the ringing frequency (time period τ or time period T12).

FIGS. 8, 9 and 10 show the relationship between the lighting efficiency η, found as described above, and the time period τ, the time period T12 and the ringing frequency Fr.

Figure 11:
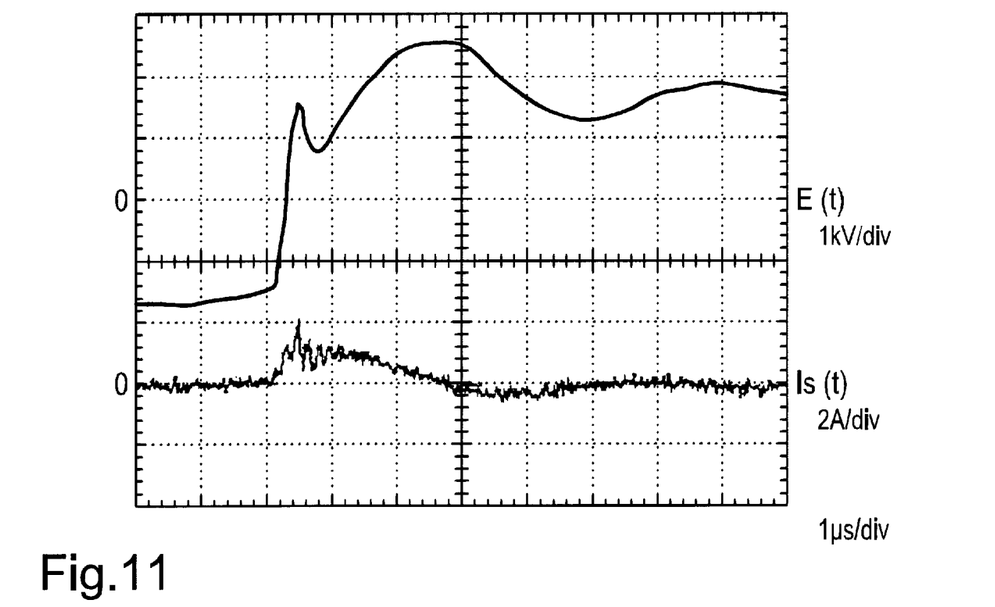
FIG. 11 shows the impressed voltage waveform E(t) and current waveform I(t) in the lighting circuit in FIG. 3 when the ringing voltage is lowered to 250 kHz.

FIG. 11 shows the waveforms of the voltage impressed on the lamp E(t) and the discharge current I(t) when the ringing frequency Fr is reduced to 250 Hz.

As is clear from FIGS. 8, 9 and 10, making the time period τ no more than 2.1 μs, the time period T12 no more than 3 μs, or the ringing frequency Fr at least 300 Hz is effective in terms of increasing the efficiency. Now, the curves a, b and c in FIGS. 8, 9 and 10 represent efficiency in the event of changes in the voltage impressed on the lamp. The voltage impressed on the lamp expressed by curve a is impressed voltage V1, curve b is impressed voltage V2 and curve c is impressed voltage V3, such that V1<V2<V3. The relative volumes of light in these cases are 1 for curve a, 1.33 for curve b and 1.67 for curve c.

Figure 12:
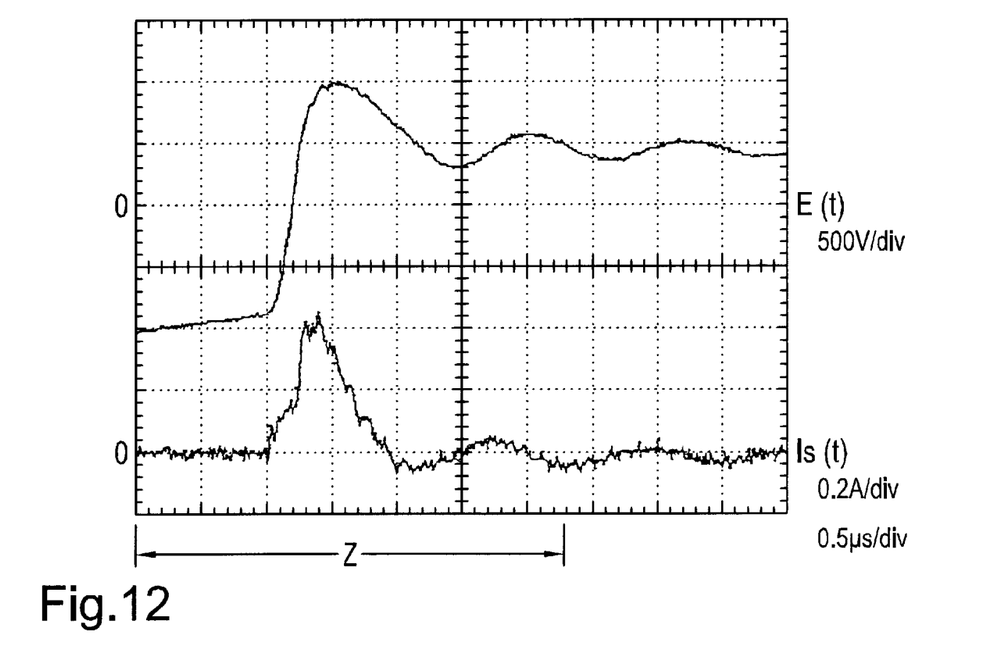
FIG. 12 is a diagram of the lighting waveform of another lamp.

FIG. 12 shows measured data for the waveforms of the voltage impressed on the lamp E(t) and the lamp current Is(t). The drawing shows an example of a case where there is no clear voltage indentation at point K to indicate the beginning of discharge.

In a case where there is no clear indentation at point K, the point at which discharge begins can be found by getting the waveform of the discharge current Id(t) from formula (1) above, using the static capacitance C1 of the condenser 12 which is the discharge plasma space, the static capacitance C2 of the condenser 13 which is the dielectrics 5,6, and the floating capacitance C3 of the dielectric-barrier discharge lamp in parallel.

Figure 13:
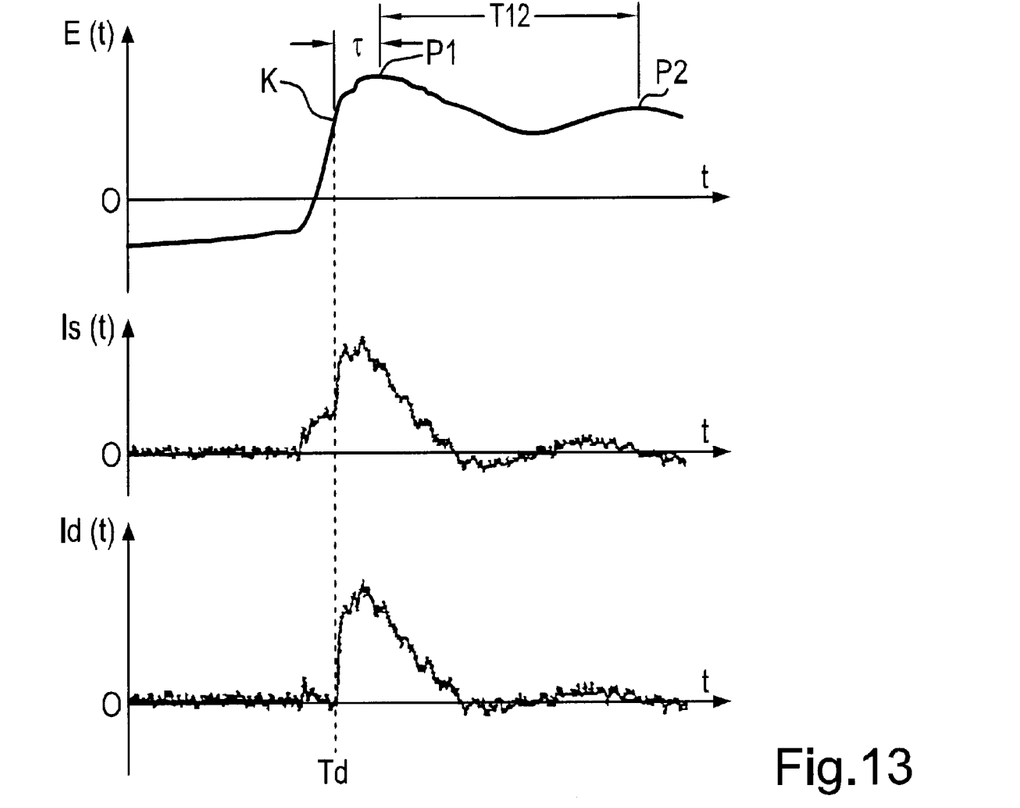
FIG. 13 is an enlarged view of the Z portion of FIG. 12, adding a calculated discharge current waveform Id(t).

FIG. 13 is an expanded view of portion Z of FIG. 12, and shows the analytical calculation of the waveform of the discharge current Id(t) along with the waveforms of the voltage impressed on the lamp E(t) and the lamp current Is(t). Now, the experimental conditions for this drawing and for the analysis of the waveform of the discharge current Id(t) are as follows:

| | |
|---|---|
| Power supply inverter method: | Push-pull |
| Static capacitance C1 of discharge plasma space: | 8.7 pF |
| Static capacitance C2 of dielectric: | 140 pF |
| Floating capacitance C3: | 10 pF |

The time Td seen in FIG. 13 marks the rapid rise of the discharge current Id(t), and is known to be the beginning of discharge. Accordingly, the point on the waveform of the voltage impressed on the lamp E(t) corresponding to this Td is equivalent to the indentation at point K, and the time period $\tau$ can be found by measuring the time from the indentation at point K to the next peak P1. In this example, the first peak P1 and the second peak P2 are clearly expressed, and the time period T12 can be gotten from the waveform of the voltage impressed on the lamp E(t).

Figure 14:
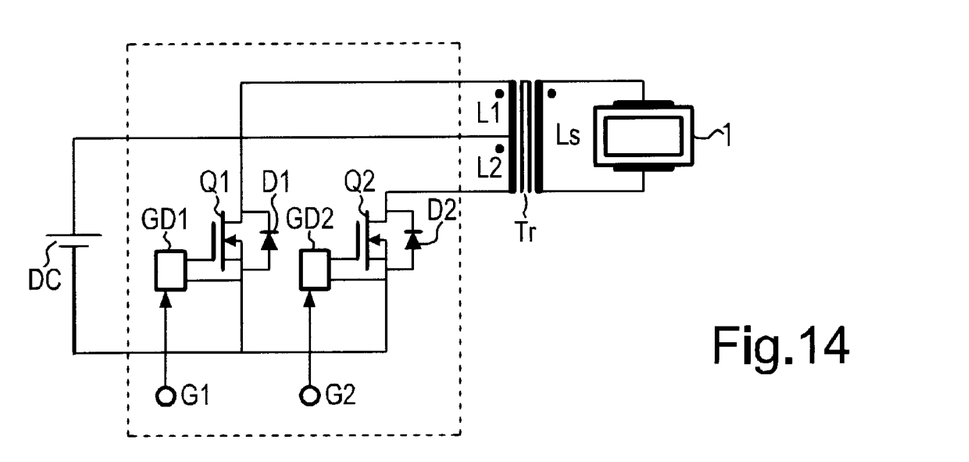
FIG. 14 is a circuit diagram showing the constitution of another lighting circuit (push-pull).
Figure 15:
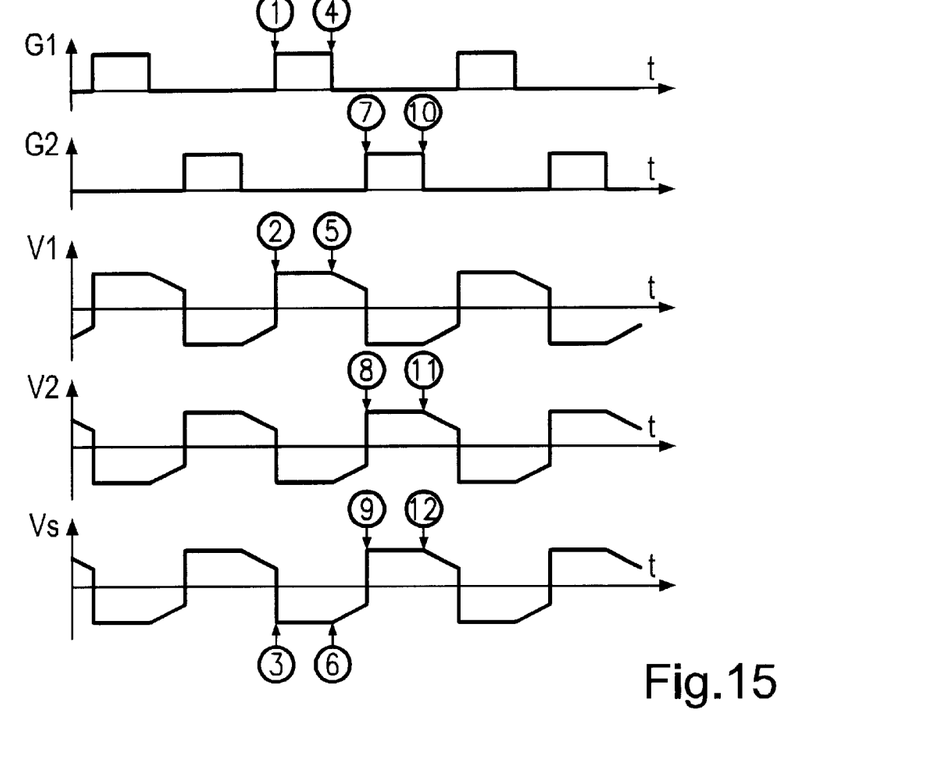
FIG. 15 is a waveform diagram to explain the operation of the lighting circuit in FIG. 14.

FIG. 14 is a diagram showing an example of the constitution using a push-pull inverter circuit as the lighting circuit; FIG. 15 is a diagram of waveforms to explain the operation of that lighting circuit. FIG. 15 shows model waveforms for a case where there is no leakage inductance on the primary or secondary sides of the transformer, and discharge does not occur so the capacitive load is continuous. In the drawing, G1 and G2 are the gate signals of the switching elements Q1 and Q2, V1 and V2 are voltages on the primary side of the transformer Tr, and Vs is the voltage on the secondary side of the transformer Tr. The operation of the lighting circuit of FIG. 3 is explained by FIG. 4.

(a) When the first gate signal G1 is turned ON, the gate drive circuits GD1 makes the first switching element Q1 conductive (point (1) in the drawing); and a direct current voltage from the direct current power supply DC is impressed on a coil L1 on the primary side of the transformer Tr (point (2) in the drawing). Because the coil L1 on the primary side of the transformer Tr and the coil Ls on the secondary side of the transformer Tr have opposite orientation, a voltage opposite that in the coil L1 on the primary side of the transformer is produced in the coil Ls on the secondary side of the transformer, and the voltage is impressed on the dielectric-barrier discharge lamp 1 (point (3) in the drawing).

(b) When the first gate signal G1 is turned OFF, the first switching element Q1 is opened;

the voltage V1 of the first coil on the primary side of the transformer Tr, the voltage V2 of the second coil on the primary side of the transformer Tr and the voltage Vs on the secondary side of the transformer begin an unstable change at a speed related to the resonant frequency determined by the leakage inductance of the transformer Tr and the static capacitance of the secondary side of the transformer Tr (points (5), (6) in the drawing).

(c) When the second gate signal G2 is turned ON, the second switching element Q2 becomes conductive (point (7) in the drawing); and a direct current voltage from the direct current power supply DC is impressed on the second coil L2 on the primary side of the transformer Tr (point (8) in the drawing). Because the coil L2 on the primary side of the transformer Tr and the coil Ls on the secondary side of the transformer Tr have the same orientation, a voltage with the same polarity as that in the coil L2 on the primary side of the transformer is produced in the coil Ls on the secondary side of the transformer, and the voltage is impressed on the dielectric-barrier discharge lamp 1 (point (9) in the drawing).

(d) When the second gate signal G2 is turned OFF, the second switching element Q2 is opened (point (10) in the drawing); the voltage V1 in the first coil on the primary side of the transformer Tr, the voltage 21 in the second coil on the primary side of the transformer Tr and the voltage Vs on the secondary side of the transformer begin an unstable change at a speed related to the resonant frequency determined by the leakage inductance of the transformer Tr and the static capacitance of the secondary side of the transformer Tr (points (11), (12) in the drawing).

(e) The operations (a) through (d) are repeated thereafter.

As is clear from the explanation above, when a push-pull type inverter circuit is used as the lighting circuit, the waveform of the voltage impressed on the dielectric-barrier discharge lamp is almost the same as when a full-bridge type inverter is used. The time period $\tau$, the time period T12 and the ringing frequency Fr can all be found as described above. And although it is not illustrated, it is the same with the use of a half-bridge inverter circuit.

Figure 16:
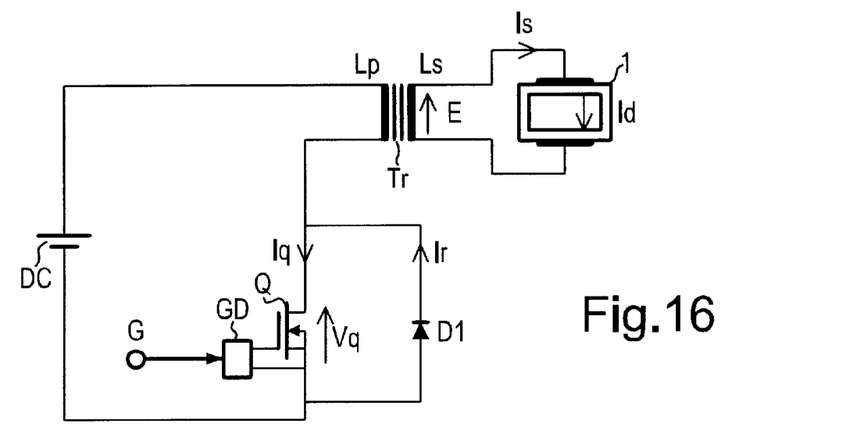
FIG. 16 is a circuit diagram showing the constitution of a fly-back lighting circuit.
Figure 17:
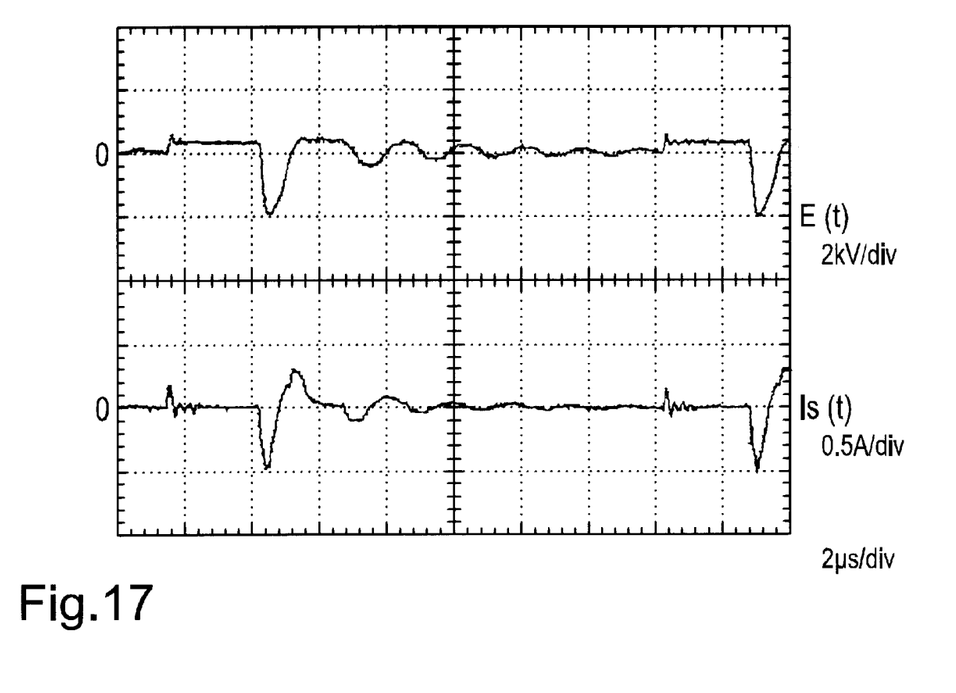
FIG. 17 shows measured data for the impressed voltage waveform E(t) and current waveform I(t) in a fly-back lighting circuit.

FIG. 16 is a diagram showing an example of the constitution using a fly-back inverter circuit as the lighting circuit; FIG. 17 is a diagram of waveforms to explain the operation of a fly-back inverter circuit as the lighting circuit.

As shown in FIG. 17, when a fly-back inverter circuit is used as the lighting circuit, the waveforms of the voltage E(t) impressed on the dielectric-barrier discharge lamp and the lamp current Is(t) are much different from those when a full-bridge, half-bridge or push-pull inverter circuit is used. Nevertheless, it is possible to light the lamp with the same good efficiency by focusing on the change of the waveform of the voltage impressed on the lamp following the indentation at point K, even when using a fly-back type inverter circuit.

The following is an explanation of the case of lighting a dielectric-barrier discharge lamp using a fly-back inverter circuit as the lighting circuit.

Figure 18:
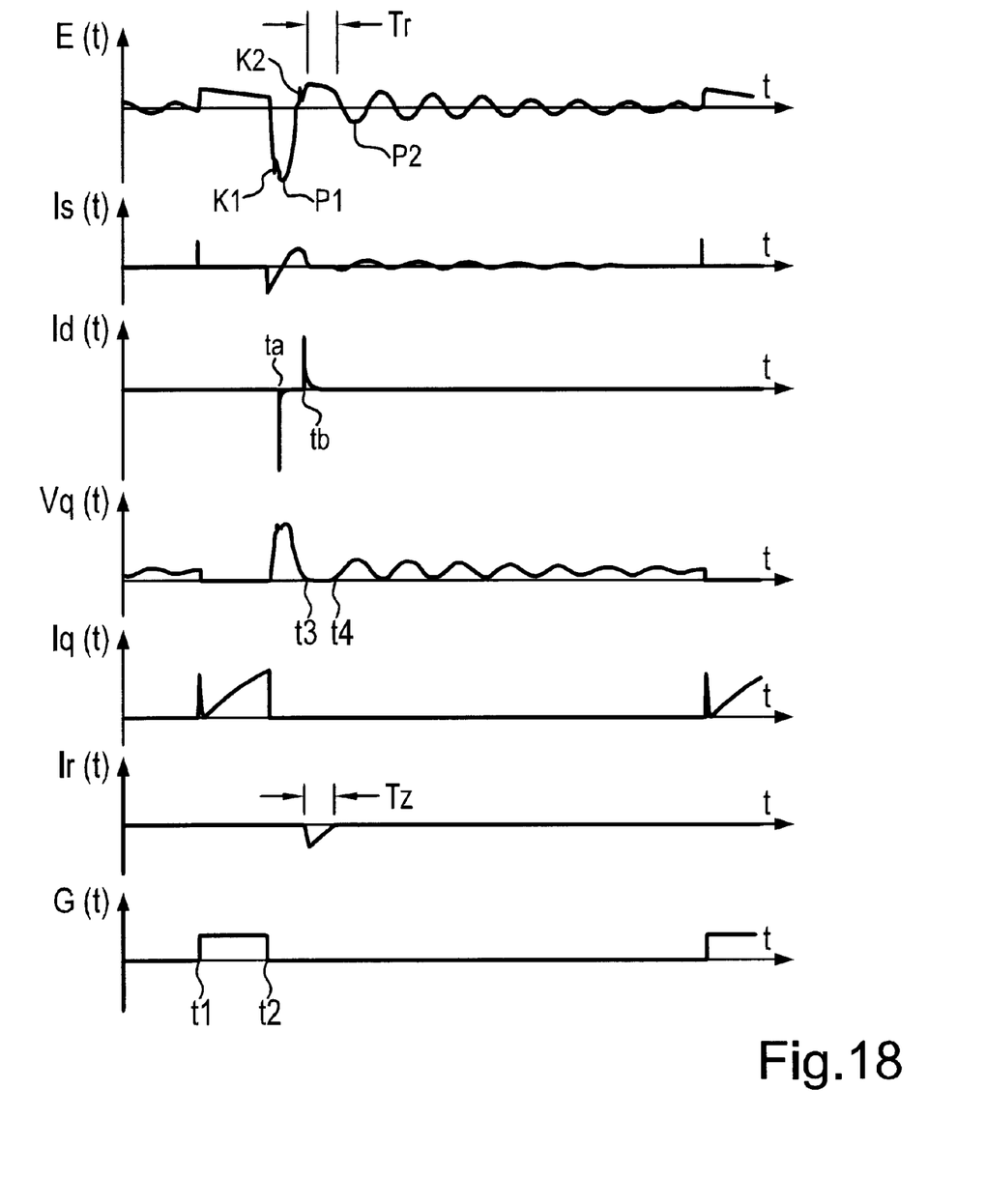
FIG. 18 is a waveform diagram showing various values when a fly-back lighting circuit is used.

FIG. 18 is a model diagram based on simulation of the waveforms in FIG. 17 and circuit waveforms. In that drawing E(t) is the waveform of the voltage on the secondary side of the transformer Tr in FIG. 16 (the voltage impressed on the dielectric-barrier discharge lamp); Is(t) is the waveform of the lamp current; Id(t) is the discharge current waveform found by analytical calculation; V.(t) is the waveform of the voltage on the switching element Q (an FET, for example), Iq(t) is the waveform of the current through the switching element Q; Ir(t) is the waveform of the current through the diode D1; ad G(t) is the gate signal input to the gate driver circuit GD.

FIG. 18 explains the operation of the lighting circuit shown in FIG. 17.

(a) The gate signal G(t) is only turned on for the period from t1 to t2, during which time there an almost linear increase of the current Iq(t) flowing through the switching element Q, stopping abruptly at time t2. The magnetic energy stored in the core of the transformer Tr in response to the current Iq(t) just before it is cut off is expressed as voltage on the primary and secondary sides of the transformer Tr, with the voltage in the secondary side of the transformer Tr stepped up in proportion to the winding ration of the transformer Tr; that secondary voltage is impressed on the dielectric-barrier discharge lamp 1.

(b) When the high voltage is impressed on the lamp 1, the lamp discharges at the instant ta, and an indentation at point K is produced in the waveform of the impressed voltage E(c) [sic]. However, the indentation at point K1 is not clear in FIG. 18. When the discharge occurs, the voltage on the discharge space is quickly neutralized, and is almost zero.

(d) Resonant oscillation of the voltage impressed on the lamp E(t) occurs at a frequency roughly determined by the static capacitance of the lamp 1 and the inductance of the secondary side of the transformer Tr.

(e) When the voltage impressed on the lamp E(t) reaches a low voltage, a high voltage of opposite polarity occurs in the discharge space because to voltage in the discharge space was neutralized by the discharge at the instant ta. Therefore, at the instant Tb a second discharge occurs, producing the indentation at point K2. However, the indentation at point K2 is not clear in FIG. 18.

(f) Because the resonant oscillation of the voltage impressed on the lamp E(t) is expressed on the primary side of the transformer Tr as well, the voltage V.(t) of the switching element Q changes as shown in FIG. 18.

(g) While the voltage V.(t) is positive, there is essentially no current flow on the primary side of the transformer Tr.

However, in the event that a diode D1 is connected in parallel with the switching element Q, when the voltage V.(t) turns negative, there is a current flow through the diode D1 for time period Tz from t3 to t4. This can be interpreted as a rapid reduction of the large impedance on the primary side of the transformer. For that reason, the free resonant oscillation of the voltage impressed on the lamp E(t) is obstructed, and in response there is a time period Tr during which the change of voltage stops.

As above, in the case of a fly-back type lighting circuit, the waveform of the voltage impressed on the lamp E(t) is relatively hard to understand, but the rise of the discharge current Id(t) starts instant discharges at times Ta and Tb, and the indentation at point K can be discriminated at that time.

In other words, even when using a fly-back type inverter circuit, it is possible to find a time period τ from the indentation at point K, which indicates the beginning of discharge, to the next peak. And it is possible to light the lamp with good efficiency by selecting an inductance for the transformer Tr such that the time period τ will not exceed 2.1 µs.

Now, in the case of a fly-back type lighting circuit using a switching element Q with a reverse parallel diode connected (or incorporating a reverse parallel diode), as described above, there is a period Ts between the first peak P1 and the second peak P2 when the basically unnecessary change of voltage stops. For that reason, the period T12 between the first and second peaks is meaningless, and the relationship is not shown in FIG. 9.

In the event that the impedance of the circuit changes during operation, as above, attention is required in the application of this invention. Now, in the case of a full-bridge, half-bridge, push-pull or fly-back inverter circuit using a switching element to which a reverse parallel diode has been added (or in which one has been incorporated), the problem described above does not occur, since the primary side of the transformer is always connected to a power supply with low impedance. Nevertheless, if the gate signal is turned OFF and the currently flowing through the reverse parallel diode finally stops, the impedance thereafter is greater and the voltage impressed on the lamp E(t) will begin resonant oscillation at a frequency roughly determined by the static capacitance of the lamp and the inductance on the secondary side, and the ringing will die away.

Now, it is possible that the discharge will not have been completed when the first peak is passed, but in that event, the period T12 will be slightly longer than the period of subsequent ringing. The extent to which it is longer will depend on the constitution of the lamp; that is, on the distribution of the sizes of the static capacitance C1 of the condenser 12 which is the discharge plasma space 2, and the static capacitance of the condenser 13 which is the dielectrics 5, 6.

Even in such a case, it is desirable to constitute the light source equipment so as to fulfill the specification $T12 \leq 3$ µs, if possible.

If, on the other hand, it is not possible to fulfill the specification $T12 < 3$ µs in such circumstances, the discharge will generally grow weaker after the first peak has passed and there will be little effect on the efficiency of ultraviolet light emission, and so it will be sufficient to constitute the light source equipment so as to fulfill either the condition $LC \leq 2.8 \times 10^{-13}$ or the condition $\tau \leq 2.1$ µs.

Now, this invention can be applied both to dielectric-barrier discharge lamps that emit ultraviolet light without a coating of fluorescent substance on the inner wall of the discharge chamber and dielectric-barrier discharge lamps that emit visible light with a coating of fluorescent substance on the inner wall of the discharge chamber.

In the invention explained above, it is possible to quickly cut off a discharge current that would break down eximer molecules, and thus to improve the lighting efficiency of a dielectric-barrier discharge lamp using a practical power supply, by constituting the lamp such that (1) after passing the point in time when the voltage value to start a dielectric-barrier discharge is reached, voltage is impressed on the dielectric-barrier discharge lamp for a period of not more than 3 µs from the largest voltage value to the next largest voltage value; or (2) voltage is impressed on the dielectric-barrier discharge lamp for a period of not more than 2.1 µs from the voltage value at which the dielectric-barrier discharge commences until the maximum voltage value in the next round of voltage impression; or (3) taking L as the inductance and C as the static capacitance of the circuit comprising the power supply equipment and the dielectric-barrier discharge lamp, the inductance L and static capacitance C are selected to fulfill the formula $LC \leq 2.8 \times 10^{-13}$.

Potential for Industrial use

This invention is light source equipment that includes what is called a dielectric-barrier discharge lamp, creating eximer molecules by means of a dielectric-barrier discharge and using the light radiated from the eximer molecules; it can be used as an ultraviolet light source for photochemical applications, for example.

What is claimed is:

1. Dielectric-barrier discharge lamp light source equipment, having a dielectric-barrier discharge lamp with a discharge plasma space filled with a discharge gas in which a dielectric-barrier discharge will create eximer molecules, with a dielectric positioned between the discharge gas and at least one of a pair of electrodes that give rise to a discharge phenomenon in the discharge gas, and dielectric-barrier discharge lamp power supply equipment to impress high voltage on the electrodes of the dielectric-barrier discharge lamp;

in which the power supply equipment impresses a high-voltage, roughly periodic waveform on the dielectric-barrier discharge lamp through a transformer; and in which, after passing a point in time when the voltage value to start a dielectric-barrier discharge is reached, voltage is impressed on the dielectric-barrier discharge lamp for a period of not more than 3 μs from the largest voltage value to the next largest voltage value.

2. Dielectric-barrier discharge lamp light source equipment, having a dielectric-barrier discharge lamp with a discharge plasma space filled with a discharge gas in which a dielectric-barrier discharge will create eximer molecules, with a dielectric positioned between the discharge gas and at least one of a pair of electrodes that give rise to a discharge phenomenon in the discharge gas, and dielectric-barrier discharge lamp power supply equipment to impress high voltage on the electrodes of the dielectric-barrier discharge lamp;

in which the power supply equipment impresses a high-voltage, roughly periodic waveform on the dielectric-barrier discharge lamp through a transformer;

and in which voltage is impressed on the dielectric-barrier discharge lamp for a period of not more than 2.1 μs from a voltage value at which the dielectric-barrier discharge commences until the maximum voltage value in the next round of voltage impression.

3. Dielectric-barrier discharge lamp light source equipment, having, a dielectric-barrier discharge lamp with a discharge plasma space filled with a discharge gas in which a dielectric-barrier discharge will create eximer molecules, with a dielectric positioned between the discharge gas and at least one of a pair of electrodes that give rise to a discharge phenomenon in the discharge gas, and dielectric-barrier discharge lamp power supply equipment to impress high voltage on the electrodes of the dielectric-barrier discharge lamp;

in which the power supply equipment impresses a high-voltage, roughly periodic waveform on the dielectric-barrier discharge lamp through a transformer;

and in which, taking L as the inductance and C as the static capacitance of a circuit comprising the power supply equipment and the dielectric-barrier discharge lamp, the inductance L and static capacitance C are selected to fulfill the formula $LC \leq 12.8 \times 10^{-13}$.

* * * * *